US007921300B2

(12) United States Patent
Crispin et al.

(10) Patent No.: US 7,921,300 B2
(45) Date of Patent: Apr. 5, 2011

(54) APPARATUS AND METHOD FOR SECURE HASH ALGORITHM

(75) Inventors: Thomas A. Crispin, Austin, TX (US);
G. Glenn Henry, Austin, TX (US);
Terry Parks, Austin, TX (US)

(73) Assignee: Via Technologies, Inc., Taipei (TW)

( * ) Notice: Subject to any disclaimer, the term of this patent is extended or adjusted under 35 U.S.C. 154(b) by 1077 days.

(21) Appl. No.: 10/963,427

(22) Filed: Oct. 12, 2004

(65) Prior Publication Data

US 2005/0089160 A1   Apr. 28, 2005

Related U.S. Application Data

(60) Provisional application No. 60/510,803, filed on Oct. 10, 2003, provisional application No. 60/571,123, filed on May 14, 2004, provisional application No. 60/582,423, filed on Jun. 24, 2004, provisional application No. 60/582,422, filed on Jun. 24, 2004, provisional application No. 60/610,481, filed on Sep. 16, 2004.

(51) Int. Cl.
*G06F 12/14* (2006.01)
*G06F 9/30* (2006.01)
*H04L 9/32* (2006.01)
*H04K 1/00* (2006.01)

(52) U.S. Cl. ............ 713/190; 713/181; 380/37; 712/32; 712/41; 712/208

(58) Field of Classification Search ........................ None
See application file for complete search history.

(56) References Cited

U.S. PATENT DOCUMENTS

| 4,250,483 | A | * | 2/1981 | Rubner | 340/910 |
|---|---|---|---|---|---|
| 5,608,801 | A | | 3/1997 | Aiello et al. | |
| RE37,178 | E | | 5/2001 | Kingdon | |
| 6,307,955 | B1 | | 10/2001 | Zank et al. | |
| 6,952,770 | B1 | * | 10/2005 | Mittal et al. | 713/168 |
| 7,047,394 | B1 | * | 5/2006 | Van Dyke et al. | 712/209 |
| 7,073,059 | B2 | * | 7/2006 | Worely et al. | 713/168 |
| 7,165,135 | B1 | * | 1/2007 | Christie et al. | 710/269 |
| 7,240,203 | B2 | * | 7/2007 | Kessler et al. | 713/171 |
| 2002/0032551 | A1 | * | 3/2002 | Zakiya | 703/2 |
| 2003/0172252 | A1 | * | 9/2003 | Henry et al. | 712/210 |
| 2003/0185391 | A1 | | 10/2003 | Qi et al. | |

FOREIGN PATENT DOCUMENTS

| EP | 0354774 A2 | 2/1990 |
|---|---|---|
| GB | 1494750 A | 12/1977 |
| WO | WO03090074 A2 | 10/2003 |

* cited by examiner

*Primary Examiner* — Nasser Moazzami
*Assistant Examiner* — Fatoumata Traore
(74) *Attorney, Agent, or Firm* — Richard K. Huffman; James W. Huffman

(57) ABSTRACT

An x86-compatible microprocessor that executes an application program fetched from memory, including a single, atomic hash instruction directing the x86-compatible microprocessor to perform the hash operation. The single, atomic hash instruction has an opcode field and a repeat prefix field. The opcode field prescribes that the x86-compatible microprocessor accomplish the hash operation. The repeat prefix field is coupled to the opcode field and indicates that the hash operation prescribed by the single, atomic hash instruction is to be accomplished on one or more message blocks. The x86-compatible microprocessor has a hash unit that is configured to execute a plurality of hash computations on each of the one or more message blocks to generate a corresponding intermediate hash value, where a last intermediate hash value that is computed for a last message block after processing all previous message blocks includes a message digest corresponding to the one or more message blocks.

41 Claims, 9 Drawing Sheets

*CONVENTIONAL DIGITAL HASH TECHNIQUE*

FIG. 4

ATOMIC HASH FUNCTION INSTRUCTION

| OPTIONAL PREFIX (401) | REPEAT PREFIX (402) | XSHA FUNCTION OPCODE (403) | HASH MODE (404) |

HASH MODE FIELD VALUES

| VALUE | HASH MODE |
|---|---|
| 0xC8 | SHA-1 |
| 0xD0 | SHA-256 |
| 0xD8 | SHA-392 |
| 0xE0 | SHA-512 |

500

HASH UNIT WITHIN AN X86-COMPATIBLE MICROPROCESSOR

FIG. 7

HASH MICRO INSTRUCTION

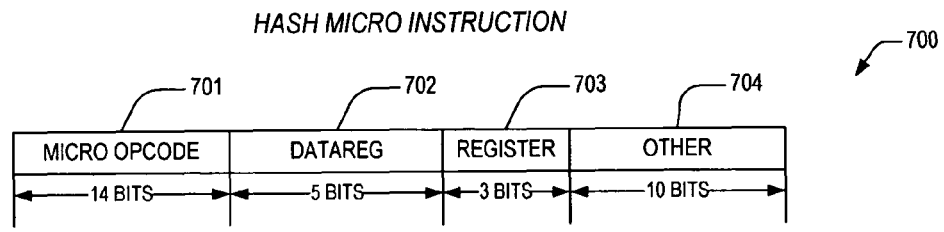

| MICRO OPCODE | DATAREG | REGISTER | OTHER |
|---|---|---|---|
| ←—14 BITS—→ | ←—5 BITS—→ | ←3 BITS→ | ←—10 BITS—→ |

REGISTER FIELD VALUES FOR XLOAD HASH MICRO INSTRUCTION

800

| VALUE | OPERATION |
|---|---|
| 000 | RESERVED |
| 001 | RESERVED |
| 010 | LOAD MSG REGISTER WITH [MSGPTR] |
| 011 | RESERVED |
| 100 | LOAD INPUT-0 (IN-0) REGISTER WITH [MDPTR] |
| 101 | LOAD INPUT-1 (IN-1) REGISTER WITH [MDPTR + 0x0080] |
| 110 | RESERVED |
| 111 | RESERVED |

FIG. 9

REGISTER FIELD VALUES FOR XSTOR HASH MICRO INSTRUCTION

900

| VALUE | OPERATION |
|---|---|
| 000 | RESERVED |
| 001 | RESERVED |
| 010 | RESERVED |
| 011 | RESERVED |
| 100 | STORE OUTPUT-0 (OUT-0) REGISTER |
| 101 | STORE OUTPUT-1 (OUT-1) REGISTER |
| 110 | RESERVED |
| 111 | RESERVED |

MODE FIELD VALUES  ← 1100

| MODE VALUE | SHA MODE |
|---|---|
| 00 | SHA-1 |
| 01 | SHA-256 |
| 00 | SHA-384 |
| 01 | SHA-512 |

APPARATUS AND METHOD FOR SECURE HASH ALGORITHM

CROSS-REFERENCE TO RELATED APPLICATIONS

This application claims the benefit of the following U.S. Provisional Applications, which are each herein incorporated by reference for all intents and purposes.

| Ser. No. | FILING DATE | TITLE |
| --- | --- | --- |
| 60/510803 (CNTR.2234) | Oct. 10, 2003 | SECURE HASH ALGORITHM APPARATUS AND METHOD |
| 60/571123 (CNTR.2240) | May 14, 2004 | APPARATUS AND METHOD FOR SECURE HASH ALGORITHM |
| 60/582423 (CNTR.2252) | Jun. 24, 2004 | SECURE HASH ALGORITHM PROGRAMMING GUIDE |
| 60/582422 (CNTR.2253) | Jun. 24, 2004 | SECURITY APPLICATION NOTE |
| 60/610481 (CNTR.2278) | Sep. 16, 2004 | VIA PROCESSORS |

BACKGROUND OF THE INVENTION

1. Field of the Invention

This invention relates in general to the field of microelectronics, and more particularly to an apparatus and method for performing hash functions on one or more message blocks to generate a message digest.

2. Description of the Related Art

An early computer system operated independently of other computer systems in the sense that all of the input data required by an application program executing on the early computer system was either resident on that computer system or was provided by an application programmer at run time. The application program generated output data as a result of being executed and the output data was generally in the form of a paper printout or a file which was written to a magnetic tape drive, disk drive, or other type of mass storage device that was part of the computer system. The output file could then be used as an input file to a subsequent application program that was executed on the same computer system or, if the output data was previously stored as a file to a removable or transportable mass storage device, it could then be provided to a different, yet compatible, computer system to be employed by application programs thereon. On these early systems, the need for protecting sensitive information was recognized and, among other information security measures, message digest generation application programs were developed and employed to protect the sensitive information from unauthorized disclosure. These application programs are also referred to as one-way hash functions, hash functions, compression applications, contraction functions, fingerprints, cryptographic checksums, message integrity checksums, and manipulation detection code. By whatever name, these applications typically take a variable length input string called a message or pre-image, and convert it to a fixed-length and generally smaller size output string called a hash or message digest.

Message digest generation functions have been employed by application programs in the information security area for many years and are used to verify the contents of a given string of data, or a file, or of many files stored on, say, a hard disk or magnetic tape. For example, consider sending a file to a someone else over the Internet. If that file contains financial, contractual, legal, or any other type of data that is important for both sender and receiver to know with high probability that it hasn't been tampered with, then the sender would perform a hash of the file and would send the message digest to the recipient along with the file itself. If the file has been changed in any way during transmission, when the recipient performs the same hash (i.e., executes the same hash function as the sender performed) of the file upon receipt, then the message digest generated upon receipt will not match that which was sent and thus, it is known that the contents of the file have changed since they were sent. Of course, it is possible for the file to be attacked in such a manner as to change both the message and the hash so that the altered hash matches the altered message. In such a case, the attack would be successful. This is why information security protocols utilize, in addition to message digest generation functions, other techniques to protect information such as encryption, secure authentication, and the like. A detailed discussion of these techniques, however, is beyond the scope of this application.

Hash functions are very useful because they are one-way functions. No cryptographic key is required for their use and the output ("message digest" or "hash") is not dependent upon the input ("message" or "pre-image") in any discernable way. Bruce Schneier notes in his work *Applied Cryptography: Protocols, Algorithms, and Source Code in C* [1996. John Wiley & Sons: New York], that "[a] single bit change in the pre-image changes, on the average, half of the bits in the hash value. Given a hash value, it is computationally infeasible to find a pre-image that hashes to that value."

With the advent of computer networks and more advanced data transmission protocols, the probability for unauthorized access of sensitive files has dramatically increased. In fact, today's network architectures, operating systems, and data transmission protocols have evolved to the extent that the ability to access shared data is not only supported, but is prominently featured. For example, it is commonplace today for a user of a computer workstation to access files on a different workstation or network file server, or to utilize the Internet to obtain news and other information, or to transmit and receive electronic messages (i.e., email) to and from hundreds of other computers, or to connect with a vendor's computer system and to provide credit card or banking information in order to purchase products from that vendor, or to utilize a wireless network at a restaurant, airport, or other public setting to perform any of the aforementioned activities. Therefore, the need to protect sensitive data and transmissions from unauthorized tampering has grown dramatically. The number of instances during a given computer session where a user is obliged to validate or verify his or her sensitive data has substantially increased. Current news headlines regularly bring computer information security issues such as spam, spyware, adware, hacking, identity theft, spoofing, and credit card fraud to the forefront of public concern. And since the motivation for these invasions of privacy range all the way from innocent mistakes to premeditated cyber terrorism, responsible agencies have responded with new laws, stringent enforcement, and public education programs. Yet, none of these responses has proved to be effective at stemming the tide of computer information compromise. Consequently, what was once the exclusive concern of governments, financial institutions, the military, and spies has now become a significant issue for the average citizen who reads their email or accesses their checking account transactions from their home computer. On the business front, one skilled in the art will appreciate that corporations from small to large presently devote a remarkable portion of their resources to the validation and verification of proprietary information.

Within the field of cryptography, several procedures and protocols have been developed that allow for users to perform hash operations without requiring great knowledge or effort and for those users to be able to transmit or otherwise provide their information products in along with a corresponding message digest to different users. One skilled in the art will appreciate that these procedures and protocols generally take the form mathematical algorithms which application programs specifically implement to accomplish a hash of sensitive information.

Several algorithms are currently used to perform digital hash functions. These include, but are not limited to, the Secure Hash Algorithm (SHA), N-Hash, Snerfu, MD2, MD4, MD5, Ripe-MD, Haval, and one-way hash functions that employ symmetric key or public-key algorithms such as CBC-MAC, which uses the Cipher Block Chaining mode of the Advanced Encryption Standard (AES) as its hash function. As noted, there are a number of hash functions which are readily available for use in the public sector, but only one of these algorithms—SHA—has seen extensive use. This is primarily because the U.S. Government has adopted SHA as the standard hash algorithm for use across all U.S. government agencies. This standard hash algorithm is specified in the Federal Information Processing Standards Publication 180-2, dated Aug. 1, 2002, and entitled *Secure Hash Standard*, which is herein incorporated by reference for all intents and purposes. This standard is available from the U.S. Department of Commerce, National Institute of Standards and Technology, Washington, D.C. Currently, SHA comprises four hash modes: SHA-1, SHA-256, SHA-384, and SHA-512.

According to SHA, a message (i.e., "input text") is divided into blocks of a specified size for purposes of performing a hash function. For example, a SHA-1 hash is performed on message blocks which are 512 bits in size, using a 32-bit word size, and which generates a 160-bit message digest. A SHA-256 hash is performed on message blocks which are 512 bits in size, using a 32-bit word size, and generates a 256-bit message digest. A SHA-384 hash is performed on message blocks which are 1024 bits in size, using a 64-bit word size, and generates a 384-bit message digest. And a SHA-512 hash is performed on message blocks which are 1024 bits in size, using a 64-bit word size, and generates a 512-bit message digest. In all cases, an initial hash value is set and is modified after processing each message block. This modified hash value is known as an intermediate hash value. The value of the hash following processing of the last message block is the message digest.

All of the SHA modes utilize the same type of sub-operations to perform hash of a message block such as bitwise logical word operations (AND, OR, NOT, Exclusive-OR), modulo addition, bit shift operations, bit rotate operations (i.e., circular shift). Different combinations of these operations are employed to generate the intermediate hash values according to the different SHA modes. Other hash algorithms utilize slightly different sub-operations and combinations of sub-operations, yet the sub-operations themselves are substantially similar to those of SHA because they are employed in a similar fashion to transform one or more message blocks into a corresponding message digest.

One skilled in the art will appreciate that there are numerous application programs available for execution on a computer system that can perform hash operations, and a great number are available for performing hashes according to SHA. In fact, some operating systems (e.g. MICROSOFT® WINDOWSXP®, LINUX®) provide direct message digest generation services in the form of hash primitives, hash application program interfaces, and the like. The present inventors, however, have observed that present day computer hash techniques are deficient in several respects. Thus, the reader's attention is directed to FIG. 1, whereby these deficiencies are highlighted and discussed below.

FIG. 1 is a block diagram 100 illustrating present day computer message digest applications. The block diagram 100 depicts a first computer workstation 101 connected to a local area network 105. Also connected to the network 105 is a second computer workstation 102, a network file storage device 106, a first router 107 or other form of interface to a wide area network (WAN) 110 such as the Internet, and a wireless network router 108 such as one of those compliant with IEEE Standard 802.11. A laptop computer 104 interfaces to the wireless router 108 over a wireless network 109. At another point on the wide area network 110, a second router 111 provides interface for a third computer workstation 103.

As alluded to above, a present day user is confronted with the issue of computer information security many times during a work session. For example, under the control of a present day multi-tasking operating system, a user of workstation 101 can be performing several simultaneous tasks, each of which require hash operations. The user of workstation 101 is required to run a hash application 112 (either provided as part of the operating system or invoked by the operating system) to generate a message digest for a local file which is then stored on the network file storage device 106. Concurrent with the file storage, the user can transmit an file and corresponding message digest to a second user at workstation 102, which also requires executing an instance of the hash application 112. In addition, the user can be accessing or providing his/her financial data (e.g., credit card numbers, financial transactions, etc.) or other forms of sensitive data over the WAN 110 from workstation 103, which requires additional instances of the hash application 112. Workstation 103 could also represent a home office or other remote computer 103 that the user of workstation 101 employs when out of the office to access any of the shared resources 101, 102, 106 on local area network 105. Each of these aforementioned activities requires that a corresponding instance of the hash application 112 be invoked. Furthermore, wireless networks 109 are now being routinely provided in coffee shops, airports, schools, and other public venues, thus prompting a need for a user of laptop 104 to hash not only his/her files (or other forms of data) to/from other users, but to employ hash functions for data that is transmitted over the wireless network 109 to the wireless router 108.

One skilled in the art will therefore appreciate that along with each activity that requires hash operations at a given workstation 101-104, there is a corresponding requirement to invoke an instance of the hash application 112. Hence, a computer 101-104 in the near future could potentially be performing hundreds of concurrent hash operations.

The present inventors have noted several limitations to the above approach of performing hash operations by invoking one or more instances of a hash application 112 on a computing system 101-104. For example, performing a prescribed function via programmed software is exceedingly slow compared to performing that same function via dedicated hardware. Each time the hash application 112 is required, a current task executing on a computer 101-104 must be suspended from execution, and parameters of the hash operation (i.e., message, hash algorithm, hash mode, etc.) must be passed through the operating system to the instance of the hash application 112, which is invoked for accomplishment of the hash operation. And because hash algorithms necessarily involve the execution of numerous of sub-operations on a particular block of data (i.e., message block), execution of the hash applications 112 involves the execution of numerous computer instructions to the extent that overall system processing speed is disadvantageously affected.

In addition, current techniques are limited because of the delays associated with operating system intervention. Most application programs do not provide integral message digest generation components; they employ components of the operating system or plug-in applications to accomplish these tasks. And operating systems are otherwise distracted by interrupts and the demands of other currently executing application programs.

Furthermore, the present inventors have noted that the accomplishment of hash operations on a present day computer system 101-104 is very much analogous to the accomplishment of floating point mathematical operations prior to the advent of dedicated floating point units within microprocessors. Early floating point operations were performed via software and hence, they executed very slowly. Like floating point operations, hash operations performed via software are disagreeably slow. As floating point technology evolved further, floating point instructions were provided for execution on floating point co-processors. These floating point co-processors executed floating point operations much faster than software implementations, yet they added cost to a system. Likewise, message digest co-processors or cores exist today in the form of add-on boards or external devices that interface to a host processor via parallel ports or other interface buses (e.g., USB). These co-processors certainly enable the accomplishment of hash operations much faster than pure software implementations. But hash co-processors add cost to a system configuration, require extra power, and decrease the overall reliability of a system. In addition, hash co-processor implementations are vulnerable to snooping because the data channel is not on the same die as the host microprocessor.

Therefore, the present inventors recognize a need for dedicated hash hardware within a present day microprocessor such that an application program that requires a hash operation can direct the microprocessor to perform the hash operation via a single, atomic, hash instruction. The present inventors also recognize that such a capability should be provided so as to preclude requirements for operating system intervention and management. Also, it is desirable that the hash instruction be available for use at an application program's privilege level and that the dedicated hash hardware comport with prevailing architectures of present day microprocessors. There is also a need to provide the hash hardware and associated hash instruction in a manner that supports compatibility with legacy operating systems and applications. It is moreover desirable to provide an apparatus and method for performing hash operations that are resistant to unauthorized observation, that can support and are programmable with respect to multiple hash algorithms, that support verification and testing of the particular hash algorithm that is embodied thereon, that are self-padding, that support multiple message block sizes, and that provide for programmable hash algorithm mode such as SHA-1, SHA-256, SHA-384, and SHA-512, for example.

SUMMARY OF THE INVENTION

The present invention, among other applications, is directed to solving the above-noted problems and addresses other problems, disadvantages, and limitations of the prior art. The present invention provides a superior technique for rapidly performing digital hash applications in a computing environment. In one embodiment, an apparatus is provided. The apparatus is configured to perform a hash operation. The apparatus includes a x86-compatible microprocessor. The x86-compatible microprocessor executes an application program that is fetched from a memory, and executes an single, atomic hash instruction within the application program that directs the x86-compatible microprocessor to perform the hash operation. The single, atomic hash instruction has an opcode field and a repeat prefix field. The opcode field prescribes that the x86-compatible microprocessor accomplish the hash operation. The repeat prefix field is coupled to the opcode field and indicates that the hash operation prescribed by the single, atomic hash instruction is to be accomplished on one or more message blocks. The x86-compatible microprocessor has a hash unit that is configured to execute a plurality of hash computations on each of the one or more message blocks to generate a corresponding intermediate hash value, where a last intermediate hash value that is computed for a last message block after processing all previous message blocks includes a message digest corresponding to the one or more message blocks. The corresponding intermediate hash value is stored to memory prior to allowing a pending interrupt to proceed One aspect of the present invention contemplates an apparatus for performing hash operations. The apparatus includes a x86-compatible microprocessor, configured to execute an application program that is fetched from a memory, and configured to execute a hash single, atomic hash instruction within the application program that directs the x86-compatible microprocessor to perform one of the hash operations, where the single, atomic hash instruction is received by the x86-compatible microprocessor, and where the hash instruction prescribes one of the hash operations. The single, atomic hash instruction has an opcode field and a repeat prefix field. The opcode field prescribes that the x86-compatible microprocessor accomplish the one or the hash operations. The repeat prefix field is coupled to the opcode field and indicates that the one of the hash operations prescribed by the single, atomic hash instruction is to be accomplished on a message, where the message includes one or more message blocks. A corresponding intermediate hash value is stored to memory prior to allowing a pending interrupt to proceed Another aspect of the present invention comprehends a method for performing hash operations in a x86-compatible microprocessor. The method includes via fetch logic within the x86-compatible microprocessor, receiving a single, atomic hash instruction, where the single, atomic hash instruction is part of an application program stored in memory which is being executed by the x86-compatible microprocessor, and where the single, atomic hash instruction prescribes one of the hash operations; and via a hash unit disposed within execution logic in the x86-compatible microprocessor, executing the one of the hash operations. The executing includes storing a corresponding intermediate hash value to memory prior to allowing a pending interrupt to proceed.

BRIEF DESCRIPTION OF THE DRAWINGS

These and other objects, features, and advantages of the present invention will become better understood with regard to the following description, and accompanying drawings where:

FIG. 4 is a block diagram showing one embodiment of an atomic hash instruction according to the present invention;

FIG. 5 is a table illustrating exemplary opcode field values according to the atomic hash instruction of FIG. 4;

FIG. 7 is a diagram illustrating fields within an exemplary micro instruction for directing hash sub-operations within the microprocessor of FIG. 6;

FIG. 8 is a table depicting values of the register field for an XLOAD micro instruction according to the format of FIG. 7;

FIG. 9 is a table showing values of the register field for an XSTOR micro instruction according to the format of FIG. 7;

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
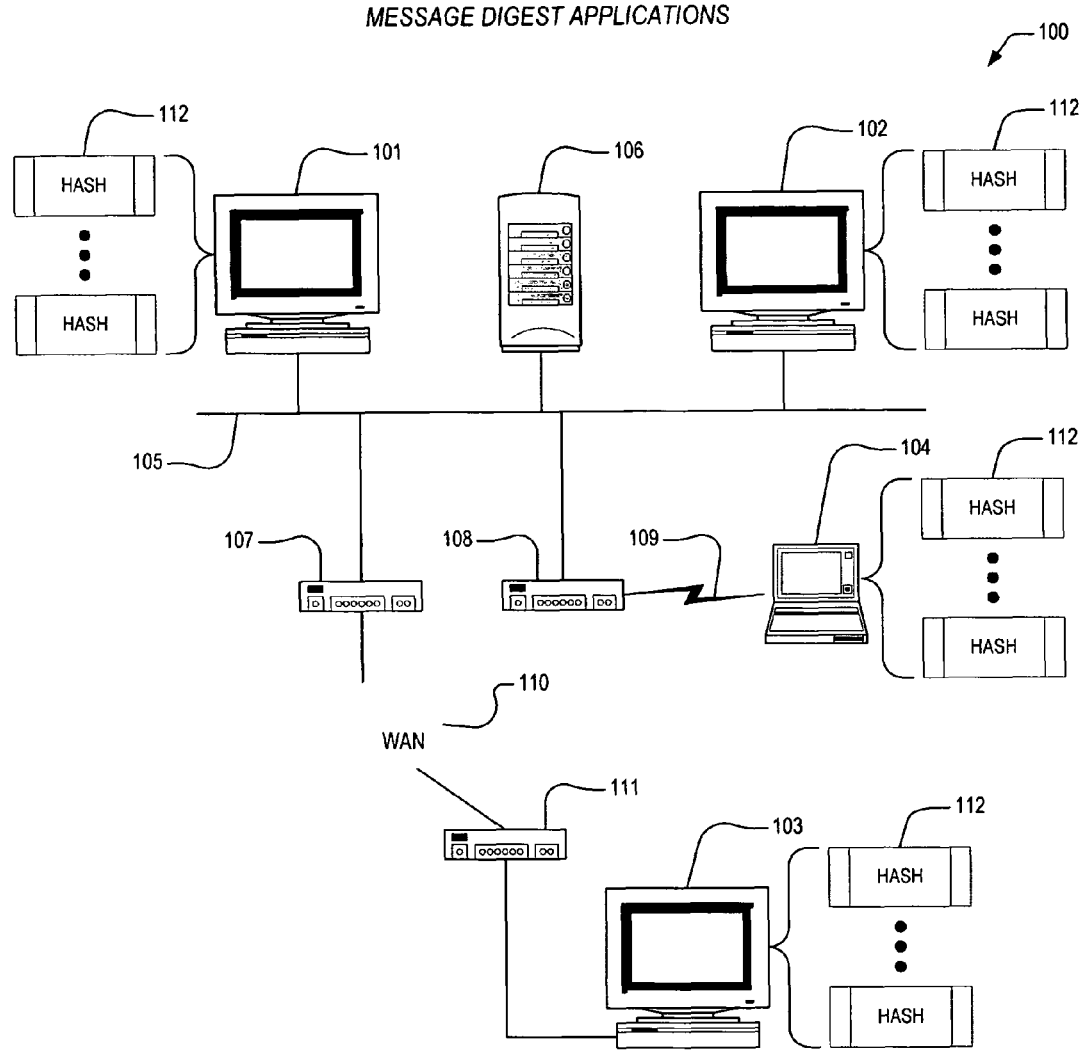
FIG. 1 is a block diagram illustrating present day message digest applications.
Figure 2:
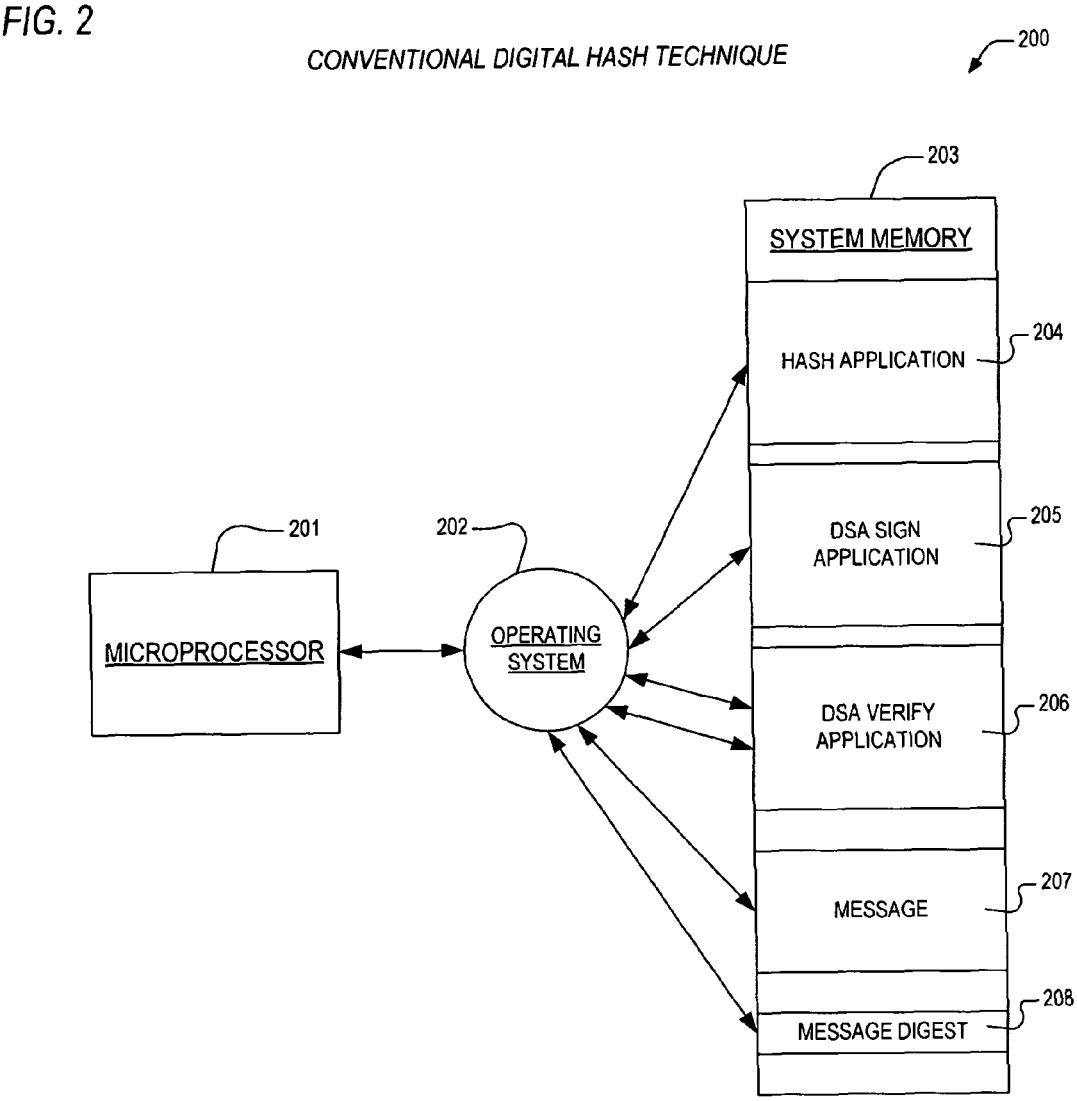
FIG. 2 is a block diagram depicting a conventional technique for performing hash operations.

In view of the above background discussion on hash operations and associated techniques employed within present day computer systems to generate a hash, or message digest that corresponds to a message that consists of one or more message blocks, the discussion of these techniques and their limitations will now be continued with reference to FIG. 2. Following this, the present invention will be discussed with reference to FIGS. 3-13. The present invention provides an apparatus and method for performing hash operations in a present day computing environment that exhibits superior performance characteristics over prevailing mechanisms and furthermore satisfies the above noted goals of limiting operating system intervention, atomicity, legacy and architectural compatibility, algorithmic and mode programmability, self-preprocessing (i.e., padding) of messages, hack resistance, and testability.

Now turning to FIG. 2, a block diagram 200 is presented depicting techniques for performing hash operations in a present day computer system as discussed above. The block diagram 200 includes a microprocessor 201 that fetches instructions and accesses data associated with an application program from system memory 203. Program control and access of data within the system memory 203 is generally managed by operating system software 202 that resides in a protected area of the system memory 203. As discussed above, if an executing application program (e.g., an email program or a file storage program) requires that a hash operation be performed, the executing application program must accomplish the hash operation by directing the microprocessor 201 to execute a significant number of instructions. These instructions may be subroutines that are part of the executing application program itself, they may be plug-in applications that are linked to the execution application program, or they may be services that are provided by the operating system 202. Regardless of their association, one skilled in the art will appreciate that the instructions will reside in some designated or allocated area of memory 203. For purposes of discussion, these areas of memory are shown within the system memory 203 and comprise a hash application 204 that typically issues a long sequence of instructions to the microprocessor 201 to retrieve a message 207 from the system memory 203, to execute a specified hash algorithm, to generate a message digest 208, and to store the message digest 208 back to memory 203. Following generation of the message digest, if a message is to be "signed,", then a digital signature algorithm (DSA) sign application 205 is executed by the microprocessor 201 to perform the functions that are required to generate a verifiable digital signature. If a "received" message is to be "verified,", then a digital signature algorithm (DSA) verify application 206 is executed by the microprocessor 206 to perform the functions that are required to verify a received digital signature. Other application programs may be substituted for the sign and verify applications 205, 206 as are appropriate for the particular task at hand which requires hashing of a message 207.

It is noteworthy that a significant number of instructions must be executed in order to generate a message digest 208 that corresponds to a particular message 207. The aforementioned Secure Hash Standard includes many examples which allow the approximate number of instructions that are required to be estimated. Consequently, one skilled in the art will appreciate that hundreds of instructions are required to accomplish a simple hash of a block of data. And each of these instructions must be executed by the microprocessor 201 in order to accomplish the requested hash operation. Furthermore, the execution of instructions to perform a hash operation is generally seen as superfluous to the primary purposes (e.g., file management, instant messaging, email, remote file access, credit card transaction) of a currently executing application program. Consequently, a user of the currently executing application program senses that the currently executing application is performing inefficiently. In the case of stand-alone or plug-in sign/verify applications 206, 207, invocation and management of these applications 206, 207 must also be subject to the other demands of the operating system 202 such as supporting interrupts, exceptions, and like events that further exacerbate the problem. Moreover, it is often true that for every concurrent hash operation that is required on a computer system, a separate instance of the applications 204, 205, 206 must be allocated in memory 203. One skilled in the art will appreciate that multiple hashes can be performed without having to allocate separate instances of the hash algorithm. A shared library (e.g., dynamic link library) technique can be employed by all applications that require a hash function, however such shared techniques require that security of individual program threads be maintained in some manner. In either case, as noted above, it is anticipated that the number of concurrent hash operations required to be performed by a microprocessor 201 will continue to increase with time.

The present inventors have noted the problems and limitations of current computer system hash techniques and furthermore recognize a need to provide apparatus and methods for performing hash operations in a microprocessor which do not exhibit disadvantageous program delays to users. Accordingly, the present invention provides an apparatus and associated methodology for performing hash operations via a dedicated hash unit within a programmable device. The hash unit is activated to perform hash operations via programming of a single, atomic hash instruction. The present invention will now be discussed with reference to FIGS. 3-16.

Figure 3:
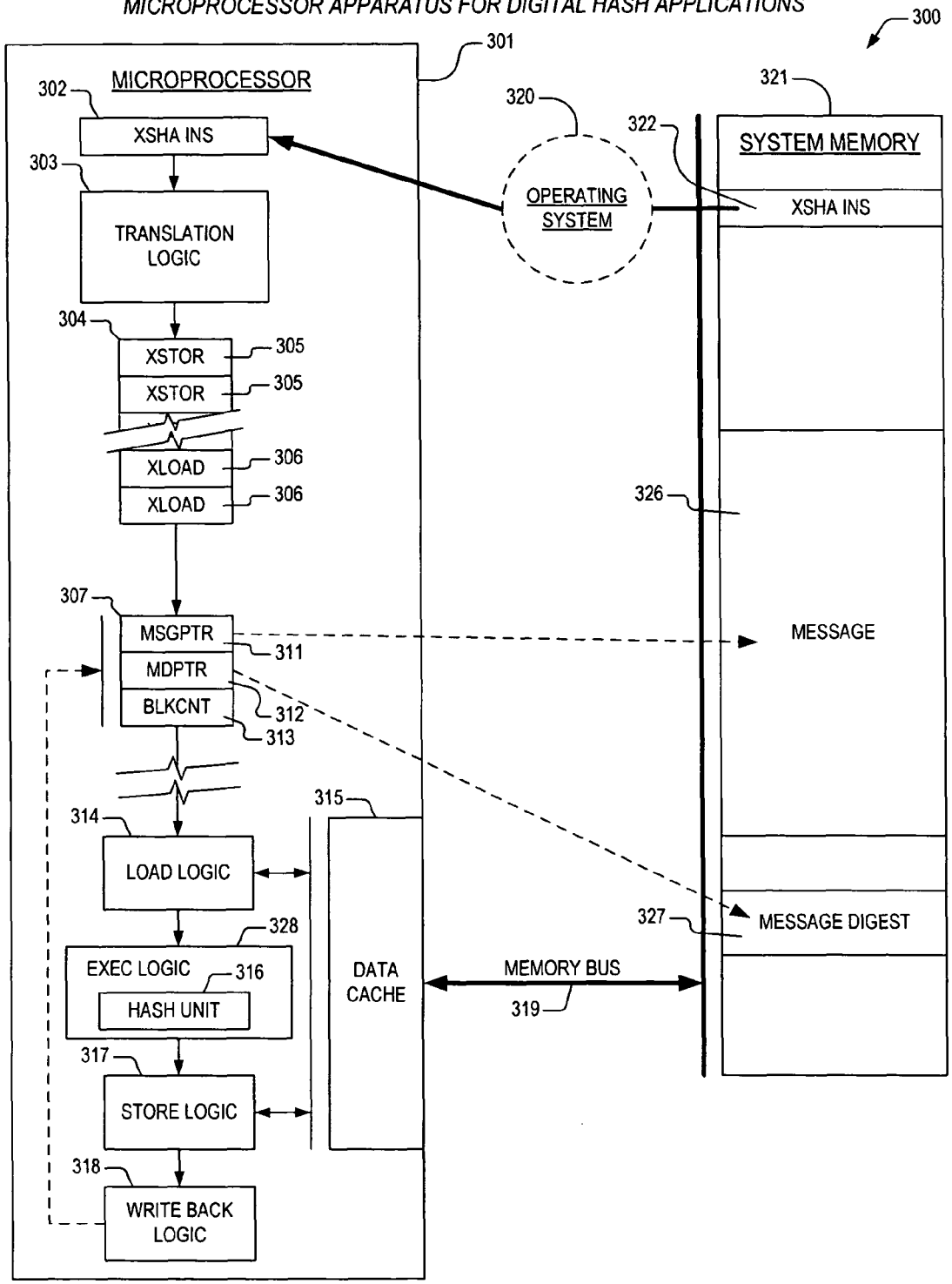
FIG. 3 is a block diagram featuring a microprocessor apparatus according to the present invention for performing hash operations.

Referring to FIG. 3, a block diagram 300 is provided featuring a microprocessor apparatus according to the present invention for performing hash operations. The block diagram 300 depicts a microprocessor 301 that is coupled to a system memory 321 via a memory bus 319. The microprocessor 301 includes translation logic 303 that receives instructions from an instruction register 302. The translation logic 303 comprises logic, circuits, devices, or microcode (i.e., micro instructions or native instructions), or a combination of logic, circuits, devices, or microcode, or equivalent elements that are employed to translate instructions into associated sequences of micro instructions. The elements employed to perform translation within the translation logic 303 may be shared with other circuits, microcode, etc., that are employed to perform other functions within the microprocessor 301. According to the scope of the present application, microcode is a term employed to refer to one or more micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor such as an x86-compatible microprocessor, x86 instructions are translated into associated micro instructions, and the associated micro instructions are directly executed by a unit or units within the CISC microprocessor. The translation logic 303 is coupled to a micro instruction queue 304. The micro instruction queue 304 has a plurality of micro instruction entries 305, 306. The micro instructions 305, 306 are provided from the micro instruction queue 304 to register stage logic that includes a register file 307. The register file 307 has a plurality of registers 311-313 whose contents are established prior to performing a prescribed hash operation. Registers 311-312 point to corresponding locations 326-327 in system memory 321: Location 326 contains a message which is to be hashed by the prescribed hash operation and location 327 contains an initial message digest value ("initial hash value). The register stage is coupled to load logic 314, which interfaces to a data cache 315 for retrieval of data for performance of the prescribed hash operation. The data cache 315 is coupled to the memory 321 via the memory bus 319. Execution logic 328 is coupled to the load logic 314 and executes the operations prescribed by micro instructions as passed down from previous stages. The execution logic 328 comprises logic, circuits, devices, or microcode (i.e., micro instructions or native instructions), or a combination of logic, circuits, devices, or microcode, or equivalent elements that are employed to perform operations as prescribed by instructions provided thereto. The elements employed to perform the operations within the execution logic 328 may be shared with other circuits, microcode, etc., that are employed to perform other functions within the microprocessor 301. The execution logic 328 includes a hash unit 316. The hash unit 316 receives data required to perform the prescribed hash operation from the load logic 314. Micro instructions direct the hash unit 316 to perform the prescribed hash operation on one or more blocks of the message 326 to generate a corresponding message digest 327. The hash unit 316 comprises logic, circuits, devices, or microcode (i.e., micro instructions or native instructions), or a combination of logic, circuits, devices, or microcode, or equivalent elements that are employed to perform hash operations. The elements employed to perform the hash operations within the hash unit 316 may be shared with other circuits, microcode, etc., that are employed to perform other functions within the microprocessor 301. In one embodiment, the hash unit 316 operates in parallel to other execution units (not shown) within the execution logic 328 such as an integer unit, floating point unit, etc. One embodiment of a "unit" within the scope of the present application comprises logic, circuits, devices, or microcode (i.e., micro instructions or native instructions), or a combination of logic, circuits, devices, or microcode, or equivalent elements that are employed to perform specified functions or specified operations. The elements employed to perform the specified functions or specified operations within a particular unit may be shared with other circuits, microcode, etc., that are employed to perform other functions or operations within the microprocessor 301. For example, in one embodiment, an integer unit comprises logic, circuits, devices, or microcode (i.e., micro instructions or native instructions), or a combination of logic, circuits, devices, or microcode, or equivalent elements that are employed to execute integer instructions. A floating point unit comprises logic, circuits, devices, or microcode (i.e., micro instructions or native instructions), or a combination of logic, circuits, devices, or microcode, or equivalent elements that are employed to execute floating point instructions. The elements employed execute integer instructions within the integer unit may be shared with other circuits, microcode, etc., that are employed to execute floating point instructions within the floating point unit. In one embodiment that is compatible with the x86 architecture, the hash unit 316 operates in parallel with an x86 integer unit, an x86 floating point unit, an x86 MMX® unit, and an x86 SSE® unit. According to the scope of the present application, an embodiment is compatible with the x86 architecture if the embodiment can correctly execute a majority of the application programs that are designed to be executed on an x86 microprocessor. An application program is correctly executed if its expected results are obtained. Alternative x86-compatible embodiments contemplate the hash unit 316 operating in parallel with a subset of the aforementioned x86 execution units. The hash unit 316 is coupled to store logic 317 and provides the corresponding message digest 327. The store logic 317 is also coupled to the data cache 315, which routes the message digest data 327 to system memory 321 for storage. The store logic 317 is coupled to write back logic 318. The write back logic 318 updates registers 311-313 within the register file 307 as the prescribed hash operation is accomplished. In one embodiment, micro instructions flow through each of the aforementioned logic stages 302, 303, 304, 307, 314, 328, 317, 318 in synchronization with a clock signal (not shown) so that operations can be concurrently executed in a manner substantially similar to operations performed on an assembly line.

Within the system memory 321, an application program that requires the prescribed hash operation can direct the microprocessor 301 to perform the operation via a single hash instruction 322, referred to herein for instructive purposes as an XSHA instruction 322. In a CISC embodiment, the XSHA instruction 322 comprises an instruction that prescribes a hash operation. In a RISC embodiment, the XSHA instruction 322 comprises a micro instruction that prescribes a hash operation. In one embodiment, the XSHA instruction 322 utilizes a spare or otherwise unused instruction opcode within an existing instruction set architecture. In one x86-compatible embodiment, the XSHA instruction 322 is a 4-byte instruction comprising an x86 REP prefix (i.e., 0xF3), followed by unused x86 2-byte opcode (e.g., 0x0FA6), followed by a 1-byte field that prescribing a particular hash mode. In one embodiment, the XSHA instruction 322 according to the present invention can be executed at the level of system privileges afforded to application programs and can thus be programmed into a program flow of instructions that are provided to the microprocessor 301 either directly by an application program or under control of an operating system 320. Since there is only one instruction 322 that is required to direct the microprocessor 301 to perform the prescribed hash operation, it is contemplated that accomplishment of the operation is entirely transparent to the operating system 320.

In operation, the operating system 320 invokes an application program to execute on the microprocessor 301. As part of the flow of instructions during execution of the application program, an XSHA instruction 322 is provided from memory 321 to the fetch logic 302. Prior to execution of the XSHA instruction 322, however, instructions within the program flow direct the microprocessor 301 to initialize the contents of registers 311-313 so that they point to locations 326-327 in memory 321 that contain input text 326 for the operation, and an initial hash value 327 and so that the number of bytes in the message 326 is provided in register 313. It is required to initialize registers 311-313 prior to executing the XSHA instruction 322 because the XSHA instruction 322 implicitly references the registers 311-312 along with register 313 that contains the byte count. Although one embodiment contemplates initialization of the byte count in register 313, other embodiments are contemplated as well such as storage of bit count, number of message blocks in the message 326, etc. Thus, the translation logic 303 retrieves the XSHA instruction from the fetch logic 302 and translates it into a corresponding sequence of micro instructions that directs the microprocessor 301 to perform the prescribed hash operation. A first plurality of micro instructions 305-306 within the corresponding sequence of micro instructions specifically directs the hash unit 316 to load a message block provided from the load logic 314 and to begin execution of a number of hash computations (as prescribed by the particular hash mode) to generate a corresponding intermediate hash value and to provide the corresponding intermediate hash value to the store logic 317 for storage in the message digest area 327 of memory 321 via the data cache 315. A second plurality of micro instructions (not shown) within the corresponding sequence of micro instructions directs other execution units (not shown) within the microprocessor 301 to perform other operations necessary to accomplish the prescribed hash operation such as management of non-architectural registers (not shown) that contain temporary results and counters, update of input and output pointer registers, processing of pending interrupts, etc. In one embodiment, registers 311-313 are architectural registers. An architectural register 311-313 is a register that is defined within the instruction set architecture (ISA) for the particular microprocessor 301 that is implemented.

In one embodiment, the hash unit 316 is divided into a plurality of stages thus allowing for pipelining of successive message blocks 326.

The block diagram 300 of FIG. 3 is provided to teach the necessary elements of the present invention and thus, much of the logic within a present day microprocessor 301 has been omitted from the block diagram 300 for clarity purposes. One skilled in the art will appreciate, however, that a present day microprocessor 301 comprises many stages and logic elements according to specific implementation, some of which have been aggregated herein for clarity purposes. For instance, the load logic 314 could embody an address generation stage followed by a cache interface stage, following by a cache line alignment stage. What is important to note, however, is that a complete hash operation on a message 326 is directed according to the present invention via a single instruction 322 whose operation is otherwise transparent to considerations of the operating system 320 and whose execution is accomplished via a dedicated hash unit 316 that operates in parallel with and in concert with other execution units within the microprocessor 301. The present inventors contemplate provision of alternative embodiments of the hash unit 316 in embodiment configurations that are analogous to provision of dedicated floating point unit hardware within a microprocessor in former years. Operation of the hash unit 316 and associated XSHA instruction 322 is entirely compatible with the concurrent operation of legacy operating systems 320 and applications, as will be described in more detail below.

Now referring to FIG. 4, a block diagram is provided showing one embodiment of an atomic hash instruction 400 according to the present invention. The hash instruction 400 includes an optional prefix field 401, which is followed by a repeat prefix field 402, which is followed by an opcode field 403, which is followed by a hash mode field 404. In one embodiment, contents of the fields 401-404 comport with the x86 instruction set architecture. Alternative embodiments contemplate compatibility with other instruction set architectures. In a SHA embodiment, the hash instruction 400 prescribes execution of a hash operation according to the Secure Hash Standard as noted above. Alternative embodiments contemplate prescription of a hash operation according to other hash algorithms to include N-Hash, Snerfu, MD2, MD4, MD5, Ripe-MD, Haval, and one-way hash functions that employ symmetric key or public-key algorithms such as CBC-MAC, which uses the Cipher Block Chaining mode of the Advanced Encryption Standard (AES) as its hash function.

Operationally, the optional prefix 401 is employed in many instruction set architectures to enable or disable certain processing features of a host microprocessor such as directing 16-bit or 32-bit operations, directing processing or access to specific memory segments, etc. The repeat prefix 402 indicates that the hash operation prescribed by the hash instruction 400 is to be accomplished on one or more blocks of a message. The repeat prefix 402 also implicitly directs a comporting microprocessor to employ the contents of a plurality of registers therein as pointers to locations in system memory that contain hash data and parameters needed to accomplish the specified hash operation. As noted above, in an x86-compatible embodiment, the value of the repeat prefix 402 is 0xF3. And, according to x86 architectural protocol, the hash instruction is very similar in form to an x86 repeat string instruction such as REP.MOVS. For example, when executed by an x86-compatible microprocessor embodiment of the present invention, the repeat prefix implicitly references a block count variable that is stored in architectural register ECX, a source address pointer (pointing to the message for the cryptographic operation) that is stored in register ESI, and a destination address pointer (pointing to the message digest area in memory) that is stored in register EDI.

The opcode field 403 prescribes that the microprocessor accomplish a hash operation. The present invention contemplates preferred choice of the opcode value 403 as one of the spare or unused opcode values within an existing instruction set architecture so as to preserve compatibility within a conforming microprocessor with legacy operating system and application software. For example, as noted above, an x86-compatible embodiment of the opcode field 403 employs value 0x0FA6 to direct execution of the specified hash operation.

The hash mode field 404 prescribes that the microprocessor accomplish the specified hash operation (e.g., SHA) according to a prescribed hash mode (e.g., SHA-1, SHA-256, etc.) as will now be described with reference to FIG. 5.

FIG. 5 is a table 500 illustrating exemplary hash mode field values according to the atomic hash instruction of FIG. 4. Value 0xC8 prescribes that the hash operation be accomplished according to the SHA-1 mode. Value 0xD0 prescribes that the hash operation be accomplished according to the SHA-256 mode. Value 0xE0 prescribes that the hash operation be accomplished according to the SHA-384 mode. And value 0xE8 prescribes that the hash operation be accomplished according to the SHA-512 mode. The noted modes are described in the aforementioned Secure Hash Standard.

Figure 6:
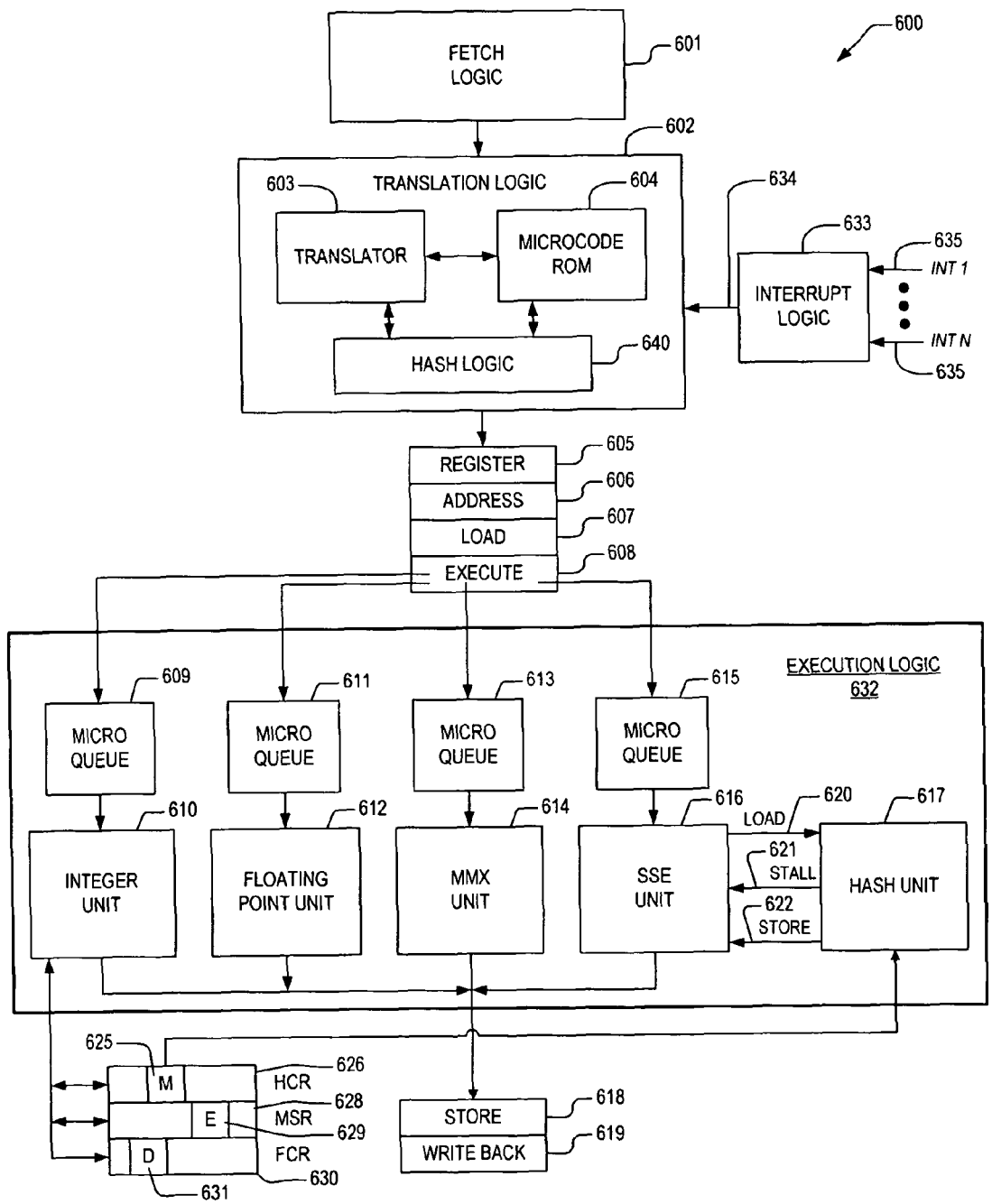
FIG. 6 is a block diagram detailing a hash unit within an x86-compatible microprocessor according to the present invention.

Now turning to FIG. 6, a block diagram is presented detailing a hash unit 617 within an x86-compatible microprocessor 600 according to the present invention. The microprocessor 600 includes fetch logic 601 that fetches instructions from memory (not shown) for execution. The fetch logic 601 is coupled to translation logic 602. The translation logic 602 comprises logic, circuits, devices, or microcode (i.e., micro instructions or native instructions), or a combination of logic, circuits, devices, or microcode, or equivalent elements that are employed to translate instructions into associated sequences of micro instructions. The elements employed to perform translation within the translation logic 602 may be shared with other circuits, microcode, etc., that are employed to perform other functions within the microprocessor 600. The translation logic 602 includes hash logic 640 that is coupled to a translator 603 and a microcode ROM 604. Interrupt logic 633 couples to the translation logic 602 via bus 634. A plurality of software and hardware interrupt signals 635 are processed by the interrupt logic 633 which indicates pending interrupts to the translation logic 602 over the interrupt bus 634. The translation logic 602 is coupled to successive stages of the microprocessor 600 including a register stage 605, address stage 606, load stage 607, execute stage 608, store stage 618, and write back stage 619. Each of the successive stages include logic to accomplish particular functions related to the execution of instructions that are provided by the fetch logic 601 as has been previously discussed with reference like-named elements in the microprocessor of FIG. 3. The exemplary x86-compatible embodiment 600 depicted in FIG. 6 features execution logic 632 within the execute stage 608 that includes parallel execution units 610, 612, 614, 616, 617. An integer unit 610 receives integer micro instructions for execution from micro instruction queue 609. A floating point unit 612 receives floating point micro instructions for execution from micro instruction queue 611. An MMX® unit 614 receives MMX micro instructions for execution from micro instruction queue 613. An SSE® unit 616 receives SSE micro instructions for execution from micro instruction queue 615. In the exemplary x86 embodiment shown, a hash unit 617 is coupled to the SSE unit 616 via a load bus 620, a stall signal 621, and a store bus 622. The hash unit 617 shares the SSE unit's micro instruction queue 615. An alternative embodiment contemplates stand-alone parallel operation of the hash unit 617 in a manner like that of units 610, 612, and 614. The integer unit 610 is coupled to a hash control register 626 to access a mode field 625 which is set to indicate a prescribed hash mode and which is accessed by the hash unit 617 to determine how to hash a message. The integer unit 610 is also coupled to a machine specific register 628 to evaluate the state of an E bit 629. The state of the E bit 629 indicates whether or not the hash unit 617 is present within the microprocessor 600. The integer unit 610 also accesses a D bit 631 in a feature control register 630 to enable or disable the hash unit 617. As with the microprocessor embodiment 301 of FIG. 3, the microprocessor 600 of FIG. 6 features elements essential to teach the present invention in the context of an x86-compatible embodiment and for clarity aggregates or omits other elements of the microprocessor 600. One skilled in the art will appreciate that other elements are required to complete the interface such as a data cache (not shown), bus interface unit (not shown), clock generation and distribution logic (not shown), etc.

In operation, instructions are fetched from memory (not shown) by the fetch logic 601 and are provided in synchronization with a clock signal (not shown) to the translation logic 602. The translation logic 602 translates each instruction into a corresponding sequence of micro instructions that are sequentially provided in synchronization with the clock signal to subsequent stages 605-608, 618, 619 of the microprocessor 600. Each micro instruction within a sequence of micro instructions directs execution of a sub-operation that is required to accomplish an overall operation that is prescribed by a corresponding instruction such as generation of an address by the address stage 606, addition of two operands within the integer unit 610 which have been retrieved from prescribed registers (not shown) within the register stage 605, storage of a result generated by one of the execution units 610, 612, 614, 616, 617 in memory by the store logic 618, etc. Depending upon the instruction that is being translated, the translation logic 602 will employ the translator 603 to directly generate the sequence of micro instructions, or it will fetch the sequence from the microcode ROM 604, or it will employ the translator 603 to directly generate a portion of the sequence and fetch the remaining portion of the sequence from the microcode ROM 604. The micro instructions proceed sequentially through the successive stages 605-608, 618, 619 of the microprocessor 600 in synchronization with the clock signal. As micro instructions reach the execute stage 608, they are routed by the execution logic 632 along with their operands (retrieved from registers within the register stage 605, or generated by logic within the address stage 606, or retrieved from a data cache by the load logic 608) to a designated execution unit 610, 612, 614, 616, 617 by placing the micro instructions in a corresponding micro instruction queue 609, 611, 613, 615. The execution units 610, 612, 614, 616, 617 execute the micro instructions and provide results to the store stage 618. In one embodiment, the micro instructions include fields indicating whether or not they can be executed in parallel with other operations.

Responsive to fetching an XSHA instruction as described above, the translation logic 602 generates associated micro instructions that direct logic within subsequent stages 605-608, 618, 619 of the microprocessor 600 to perform the prescribed hash operation. The particular construct of the associated micro instructions is determined in part by the value of the hash mode field 404 within the XSHA instruction 400. For example, if the value of the hash mode field 404 specifies that a SHA-256 mode be employed during execution of a prescribed hash operation, then the hash logic 640 will construct the associated sequence of micro instructions to direct the microprocessor 600 to retrieve the message from the memory locations 326 pointed to by contents of the message pointer register 311, to load the message according to SHA-256 block sizes into the hash unit 617 as will be further detailed below, and to employ SHA-256 sub-operations during execution of the prescribed hash operation to generate a 256-bit message digest.

Accordingly, a first plurality of the associated micro instructions are routed directly to the hash unit 617 and direct the unit 617 to load initial hash value data provided over the load bus 620 and to load a block of message data and begin execution of a number of hash computations to produce an intermediate hash value and to provide the intermediate hash value to the store bus 622 for storage in memory by the store logic 618. A second plurality of the associated micro instructions are routed to other execution units 610, 612, 614, 616 to perform other sub-operations that are necessary to accomplish the prescribed hash operation such as testing of the E bit 629, enabling the D bit 631, setting the value of the mode field 625 to indicate which hash mode is to be employed during execution of the hash operation, updating registers (e.g., count register, message pointer register, message digest pointer register) within the register stage 605, processing of interrupts 635 indicated by the interrupt logic 633 over the interrupt bus 634, padding of messages, etc. The associated micro instructions are ordered to provide for optimum performance of specified hash operations on multiple blocks of a message by interlacing integer unit micro instructions within sequences of hash unit micro instructions so that integer operations can be accomplished in parallel with hash unit operations. Because the pointers to the message and message digest, and the byte count are provided within architectural registers, their states are saved when interrupts are processed and the states are restored upon return from interrupts. When an interrupt is pending, the hash of the message block currently being processed is completed, the intermediate hash value is stored to memory, and the architectural registers are updated prior to allowing the interrupt to proceed. Upon return from the interrupt, the hash operation is repeated on the particular block of input data that was being processed when the interrupt occurred using the current value stored in the message digest location in memory, in substantial similarity to execution of the "REP" instructions particularly prevalent in the x86 instruction set. As each "rep" portion of the hash instruction is completed, its corresponding intermediate hash value is written to the message digest location in memory.

Now referring to FIG. 7, a diagram is presented illustrating fields within an exemplary micro instruction 700 for directing hash sub-operations within the microprocessor of FIG. 6. The micro instruction 700 includes a micro opcode field 701, a data register field 702, a register field 703, and an other field 704. The micro opcode field 701 specifies a particular sub-operation to be performed and designates logic within one or more stages of the microprocessor 600 to perform the sub-operation. Specific values of the micro opcode field 701 designate that the micro instruction is directed for execution by a hash unit according to the present invention. In one embodiment, there are two specific values. A first value (XLOAD) designates that data is to be retrieved from a memory location whose address is specified by contents of an architectural register denoted by contents of the data register field 702. The data is to be loaded into a register within the hash unit that is specified by contents of the register field 703. The retrieved data (e.g., message digest data or message block data) is provided to the hash unit. A second value (XSTOR) of the micro opcode field 701 designates that data generated by the hash unit is to be stored in a memory location whose address is specified by contents of an architectural register denoted by contents of the data register field 702. In a multi-stage embodiment of the hash unit, contents of the register field 703 prescribe one of a plurality of message digest locations for storage in memory. The message digest data is provided by the hash unit for access by store logic. The other field 704 specifies control information that is beyond the scope of this application. More specific details concerning XLOAD and XSTOR micro instructions for execution by a hash unit according to the present invention will now be discussed with reference to FIGS. 8 and 9.

Turning to FIG. 8, a table 800 is presented depicting values of the register field 703 for an XLOAD micro instruction according to the format 700 of FIG. 7. As was previously discussed, a sequence of micro instructions is generated in response to translation of an XSHA instruction. The sequence of micro instructions comprises a first plurality of micro instructions that are directed for execution by the hash unit and a second plurality of micro instructions that are executed by one or more of the parallel functional units within the microprocessor other that the hash unit. The second plurality of micro instructions direct sub-operations such as padding of messages; updating of counters, temporary registers, and architectural registers; testing and setting of fields and status bits in machine specific or control registers, and so on. The first plurality of instructions provide initial hash and message block data to the hash unit, and direct the hash unit to generate an intermediate hash value and to store the intermediate hash value to memory. An XLOAD micro instruction is provided to the hash unit to load initial (or intermediate) hash value data or to load a portion of a message block and to begin execution of the prescribed hash operation. Value 0b100 in the register field 703 of an XLOAD micro instruction directs the hash unit to load a portion of an initial (or intermediate) hash value into its input-0 register. As this micro instruction proceeds down the pipeline, an architectural message digest pointer register within the register stage is accessed to obtain the address in memory where the message digest is stored. Address logic translates the address into a physical address for a memory access. The load logic fetches the portion of the message digest from cache and passes it to the hash unit. Likewise, register field value 0b101 directs the hash unit to load the remaining portion of the initial (or intermediate) hash value into its input-1 register. Value 0b010 directs the hash unit to load a portion of a message block pointed to by contents of the data register field 702 into its message register (MSG) and to begin execution of the prescribed hash operation according to the mode indicated by the hash mode field in the hash control register.

All other values of the register field 703 in an XLOAD micro instruction are reserved.

Referring to FIG. 9, a table 900 is presented showing values of the register field 703 for an XSTOR micro instruction according to the format 700 of FIG. 7. An XSTOR micro instruction is issued to the hash unit to direct it to provide a generated hash value to store logic for storage in memory at the address provided in the address field 702. Accordingly, translation logic according to the present invention issues an XSTOR micro instruction for a particular hash value following issuance of one or more XLOAD micro instructions for its corresponding message block. Value 0b100 of the register field 703 directs the hash unit to provide a portion of the hash value associated with its internal output-0 OUT-0 register to store logic for storage. Likewise, contents of internal output-1 register, referenced by register field value 0b101, provide the remaining portion of the hash value. Accordingly, following loading initial hash values, a plurality of message blocks can be pipelined through the hash unit by issuing hash micro instructions in the order XLOAD.MSG, XLOAD.MSG, XLOAD.MSG, XLOAD.MSG, XSTOR.OUT-0, XSTOR.OUT-1, XLOAD.MSG, XLOAD.MSG, and so on.

Figures 10, 11:
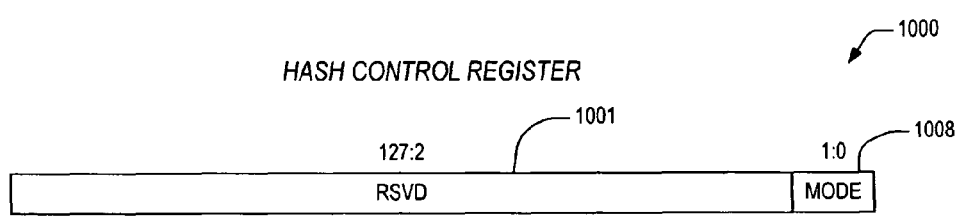
FIG. 10 is diagram highlighting an exemplary hash unit control word format for prescribing a hash algorithm for accomplishment of a hash operation according to the present invention.
FIG. 11 is a table depicting values of the MODE field for the control word of FIG. 10.

Now turning to FIG. 10, a diagram is provided highlighting an exemplary hash control register format 1000 for prescribing hash algorithm mode of a hash operation according to the present invention. The control register 1000 contents are set according to the value of the hash mode field of an XSHA instruction, which is programmed by a user. The contents of the hash control register 1000 are set prior to performing a hash operation. Accordingly, as part of a sequence of micro instructions corresponding to a provided XSHA instruction, an integer micro instruction is issued directing the microprocessor to set the value of the control register 1000. The control register 1000 includes a reserved RSVD field 1001 and a mode field 1002.

All values for the reserved field 1001 are reserved. Contents of the mode field 1002 indicate a particular hash mode to be employed during execution of a prescribed hash operation, as will now be described with reference to FIG. 11.

Turning to FIG. 11, a table 1100 is presented illustrating exemplary values of the mode field 1002 for the control register 1000 of FIG. 10. A "00" value of the mode field 1002 directs a computing device according to the present invention to perform a prescribed hash operation according to the SHA-1 algorithm mode. A "01" value of the mode field 1002 directs a computing device according to the present invention to perform a prescribed hash operation according to the SHA-256 algorithm mode. A "10" value of the mode field 1002 directs a computing device according to the present invention to perform a prescribed hash operation according to the SHA-384 algorithm mode. A "11" value of the mode field 1002 directs a computing device according to the present invention to perform a prescribed hash operation according to the SHA-512 algorithm mode.

Figure 12:
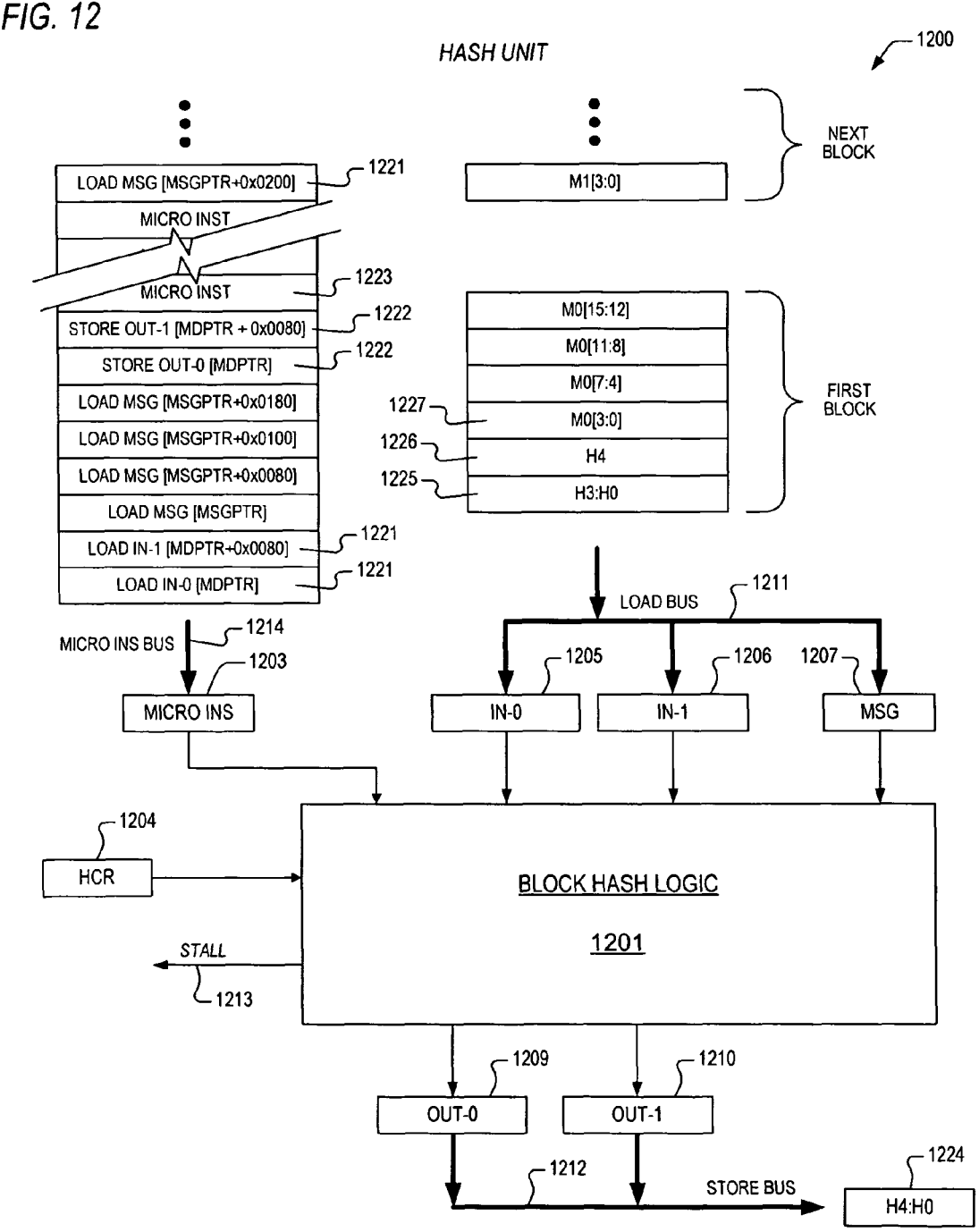
FIG. 12 is a block diagram featuring details of an exemplary hash unit according to the present invention.

Now referring to FIG. 12, a block diagram is presented featuring details of an exemplary hash unit 1200 according to the present invention. The hash unit 1200 includes a micro instruction register 1203 that receives hash unit micro instructions (i.e., XLOAD and XSTOR micro instructions) 1221-1223 via a micro instruction bus 1214. The hash unit 1200 also accesses a hash control register 1204, and includes an input-0 register 1205, and input-1 register 1206, and a message register 1207. Initial/intermediate hash values 1225-1226 along with message block data 1227 are provided to registers 1205-1207 via a load bus 1211 as prescribed by contents of an XLOAD micro instruction within the micro instruction register 1203. The hash unit 1200 also includes block hash logic 1201 that is coupled to all of the registers 1203-1207. The block hash logic 1201 provides a stall signal 1213 and provides intermediate/final message digest values 1224 to an output-0 register 1209 and an output-1 register 1210. The output registers 1209-1210 route the intermediate/final hash values 1224 (i.e., message digest values) to successive stages in a conforming microprocessor via a store bus 1212. In one embodiment, the micro instruction register 1203 and the hash control register 1204 are 32 bits in size; and registers 1205-1207, 1209-1210 are 128-bits in size. Alternative embodiments contemplate 64-bit and 256-bit registers 1205-1207, 1209-1210 to optimize data throughput according to the particular hash operation that is being implemented. The example of FIG. 12 depicts micro instructions 1221-1223 and data 1224-1227 that is sized for execution of a SHA-1 hash function. These sizes are provided to clearly teach the present invention but it is noted that the bounds of the present invention are not to be restricted to such sizes, hash algorithms, or hash modes. As noted above, the present invention comprehends any of the aforementioned hash algorithms and modes.

Operationally, hash unit micro instructions are provided sequentially to the micro instruction register 1203 along with data 1225-1227 that is designated for the input registers 1205-1206 and for the message register 1207. In the embodiment discussed with reference to FIGS. 8 and 9, an initial hash value is loaded via XLOAD micro instructions 1221 to the IN-0 and IN-1 registers 1205-1206. Following this, a first portion of a message block 1227 is loaded to the message register 1207. An XLOAD micro instruction to message register 1207 directs the hash unit to load message data 1227 to the message register 1207 and to begin execution of hash computations according to the hash mode provided via contents of the hash control register 1204. Upon receipt of an XLOAD micro instruction designating MSG 1207, the block hash logic 1201 starts performing the hash operation prescribed by contents of the control register to generate an intermediate/final hash value 1224. Once initiated, the block hash logic 1201 continues executing the prescribed hash operation on supplied message data 1227 until the operation is completed. The hash unit 1200 performs a specified operation on designated portions 1227 of a message, either complete blocks or sub-blocks. Successive blocks of a message are hash through the execution of corresponding successive XLOAD and XSTOR micro instructions. When an XSTOR micro instruction is executed, if the prescribed hash value 1224 (i.e., OUT-0 or OUT-1) has not yet completed generation, then the block hash logic 1201 asserts the stall signal 1213. Once the hash value 1224 has been generated and placed into a corresponding output register 1209-1210, then the contents of that register 1209-1210 are transferred to the store bus 1212. Upon generation of a final hash value 1224, the contents of the output registers 1209-1210 contain the completed message digest 1224 that corresponds to the complete message.

Figure 13:
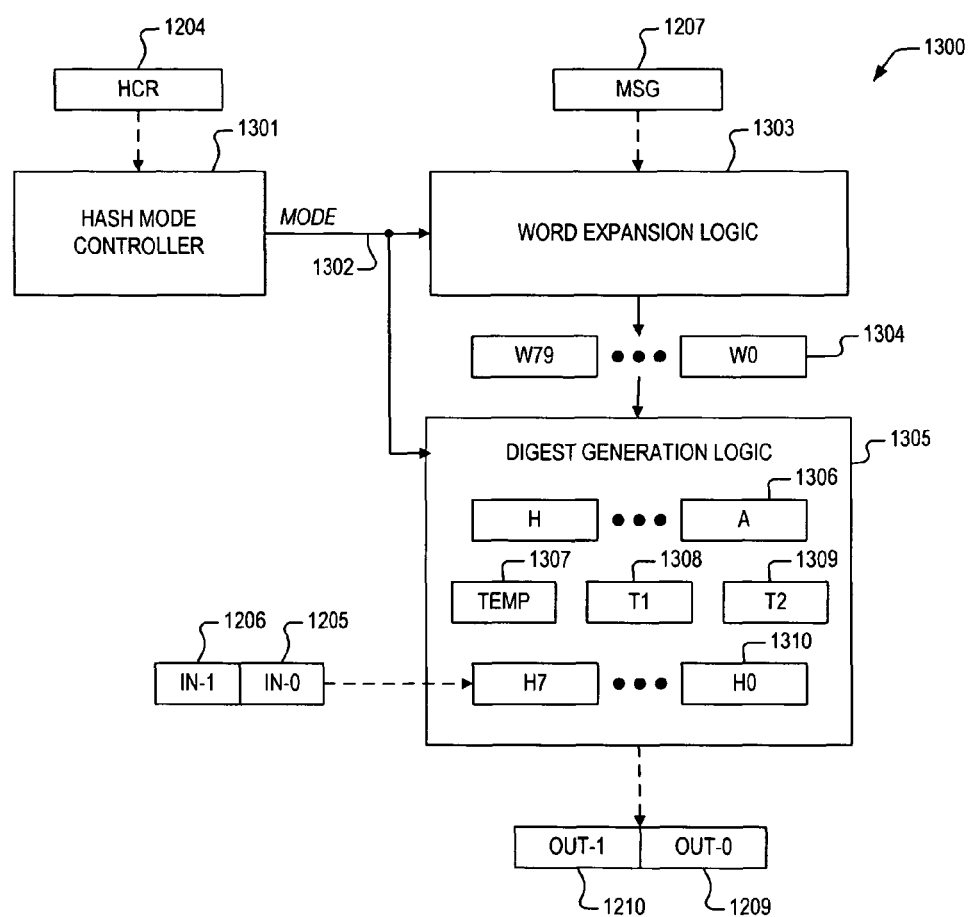
FIG. 13 is a block diagram illustrating an embodiment of block hash logic according to the present invention for performing hash operations in accordance with hash algorithms specified in the Secure Hash Standard.

Now turning to FIG. 13, a block diagram is provided illustrating an exemplary embodiment of block hash logic 1300 according to the present invention for performing hash operations in accordance with the Secure Hash Standard. The block hash logic 1300 includes a hash mode controller 1301 that accesses a hash control register 1204 and that is coupled to word expansion logic 1303 and digest generation logic 1305 via a mode bus 1302. The word expansion logic 1303 receives a portion of a message block from the message register 1207 and expands a message block into words of a message schedule according to the specified SHA mode, which are provided to word registers W79:W0 1304. One skilled will appreciate that a SHA-1 message schedule employs all 80 word registers 1304, SHA-256 employs word registers W63:W0 1304 (i.e., only 64 words in a SHA-256 message schedule), and SHA-384 and SHA-512 message schedules employ all 80 word registers 1304. One skilled will also appreciate that different logical operations are executed on a message block to expand a message schedule according to the SHA mode specified by the hash control register 1204. The word expansion logic 1303 comprises the logic required to perform the logical operations required for all implemented SHA modes and performs those operations as directed by the hash mode controller 1301 via the mode bus 1302. Likewise, the block has logic 1305 includes digest generation logic 1305 that receives the message schedule from the word registers 1304 and that initializes working variable registers H:A 1306, that computes the contents of temporary variable registers TEMP 1307, T1 1308, and T2 1309, and that computes contents of intermediate/final hash value registers H7:H0 1310. As noted above, registers H7:H0 1310 are initialized by XLOAD instructions to registers IN-0 1205 and IN-1 1206. The contents of H7:H0 are provided to a store bus via execution of XSTOR instructions according to the present invention. Like the word expansion logic 1303, the digest generation logic 1305 includes that logic required to implement all prescribed SHA hash modes, and executes only those sub-operations as directed by the hash mode controller 1301 via the mode bus 1302. For example, for a SHA-1 hash, only registers E:A 1306, TEMP 1307, and H4:H0 1310 are employed as well as other logic therein as required to execute a SHA-1 hash computation. Registers H:A 1306, T1 1308, T2 1309, and H7:H0 1310 are employed for execution of SHA-256, SHA-384, and SHA-512 operations. And one skilled will appreciate that a SHA-384 hash employs the same logical sub-functions as a SHA-512 hash, with the exception that a different initial hash values are loaded via IN-1 1206 and IN-0 1205, and that the final hash value in registers H7:H0 1310 is truncated to its leftmost 384 bits.

In the embodiment shown in FIG. 13, the block hash logic 1300 engine is divided into two stages: a first stage between the message register MSG 1207 and the word registers W79:W0 1304 and a second stage between the word registers 1304 and the output registers 1209-1210. Intermediate hash data is pipelined between these stages in synchronization with a clock signal (not shown). When a hash operation is completed on a block of input data, the associated hash value is placed into the output registers 1209-1210. Execution of an XSTOR micro instruction causes contents of a designated output register 1209-1210 to be provided to a store bus (not shown).

Although the present invention and its objects, features, and advantages have been described in detail, other embodiments are encompassed by the invention as well. For example, the present invention has been discussed at length according to embodiments that are compatible with the x86 architecture. However, the discussions have been provided in such a manner because the x86 architecture is widely comprehended and thus provides a sufficient vehicle to teach the present invention. The present invention nevertheless comprehends embodiments that comport with other instruction set architectures such as POWERPC®, MIPS®, and the like, in addition to entirely new instruction set architectures.

The present invention moreover comprehends execution of hash operations within elements of a computing system other than the microprocessor itself. For example, the hash instruction according to the present invention could easily be applied within an embodiment of a hash unit that is not part of the same integrated circuit as a microprocessor that exercises as part of the computer system. It is anticipated that such embodiments of the present invention are in order for incorporation into a chipset surrounding a microprocessor or as a processor dedicated for performing hash operations where the hash instruction is handed off to the processor from a host microprocessor. It is contemplated that the present invention applies to embedded controllers, industrial controllers, signal processors, array processors, and any like devices that are employed to process data. The present invention also comprehends an embodiment comprising only those elements essential to performing hash operations as described herein. A device embodied as such would indeed provide a low-cost, low-power alternative for performing hash operations only, say, as a hash processor within a communications system. For clarity, the present inventors refer to these alternative processing elements as noted above as processors.

Furthermore, although the secure hash algorithm has been prominently featured in this application, the present inventors note that the invention described herein encompasses lesser known hash algorithms as well such as are alluded to herein. What is sufficient to comprehend is that the present invention provides dedicated hash apparatus and supporting methodology within a microprocessor where atomic hash operations can be invoked via execution of a single instruction.

Finally, although the present invention has been specifically discussed as a single hash unit that supports a prescribed hash algorithm, the invention also comprehends provision of multiple hash units operatively coupled in parallel with other execution units in a conforming microprocessor where each of the multiple hash units is configured to perform a specific hash algorithm. For example, a first unit is configured for SHA, a second for CBC-MAC, and so on.

Those skilled in the art should appreciate that they can readily use the disclosed conception and specific embodiments as a basis for designing or modifying other structures for carrying out the same purposes of the present invention, and that various changes, substitutions and alterations can be made herein without departing from the spirit and scope of the invention as defined by the appended claims.

We claim:

1. An apparatus, configured to perform a hash operation, the apparatus comprising:
   an x86-compatible microprocessor, configured to execute an application program that is fetched from a memory, and configured to execute a single, atomic hash instruction within said application program that directs said x86-compatible microprocessor to perform the hash operation, said single, atomic hash instruction comprising:
      an opcode field, configured to prescribe that the x86-compatible microprocessor accomplish the hash operation; and
      a repeat prefix field, coupled to said opcode field, configured to indicate that the hash operation prescribed by said single, atomic hash instruction is to be accomplished on one or more message blocks;
   said x86-compatible microprocessor comprising:
      a hash unit, configured to execute a plurality of hash computations on each of said one or more message blocks to generate a corresponding intermediate hash value, wherein a last intermediate hash value that is computed for a last message block after processing all previous message blocks comprises a message digest corresponding to said one or more message blocks, and wherein said corresponding intermediate hash value is stored to memory prior to allowing a pending interrupt to proceed, and wherein said hash unit executes a first plurality of micro instructions generated by translation of said single, atomic hash instruction; and
      an x86 integer unit, wherein said hash unit operates in parallel with said x86 integer unit to accomplish the hash operation, and wherein said x86 integer unit executes a second plurality of micro instructions generated by translation of said single, atomic cryptographic instruction to test a bit in a flags register, to update text pointer registers, and to process interrupts during execution of the hash operation.

2. The apparatus as recited in claim 1, wherein the hash operation is accomplished at the level of system privileges afforded to application programs.

3. The apparatus as recited in claim 1, wherein said single, atomic hash instruction prescribes a hash algorithm to be employed in accomplishing the hash operation.

4. The apparatus as recited in claim 3, wherein said hash algorithm comprises:
   a SHA-1 algorithm, wherein the hash operation comprises generation of a SHA-1 message digest for said one or more message blocks.

5. The apparatus as recited in claim 3, wherein said hash algorithm comprises:
a SHA-256 algorithm, wherein the hash operation comprises generation of a SHA-256 message digest for said one or more message blocks.

6. The apparatus as recited in claim 3, wherein said hash algorithm comprises:
a SHA-384 algorithm, wherein the hash operation comprises generation of a SHA-384 message digest for said one or more message blocks.

7. The apparatus as recited in claim 3, wherein said hash algorithm comprises:
a SHA-512 algorithm, wherein the hash operation comprises generation of a SHA-512 message digest for said one or more message blocks.

8. The apparatus as recited in claim 1, wherein said single, atomic hash instruction is prescribed according to the x86 instruction format.

9. The apparatus as recited in claim 1, wherein said single, atomic hash instruction implicitly references a plurality of registers within the device.

10. The apparatus as recited in claim 9, wherein said plurality of registers comprises:
a first register, wherein contents of said first register comprise a pointer to a memory address, said memory address specifying a location in a memory for access of said one or more message blocks upon which the hash operation is to be accomplished.

11. The apparatus as recited in claim 9, wherein said plurality of registers comprises:
a first register, wherein contents of said first register comprise a pointer to a memory address, said memory address specifying a location in said memory for storage of message digest, and wherein said message digest is generated as a result of accomplishing the hash operation upon said one or more message blocks.

12. The apparatus as recited in claim 9, wherein said plurality of registers comprises:
a first register, wherein contents of said first register indicate a number of bytes within said one or more message blocks.

13. The apparatus as recited in claim 1, wherein said hash unit comprises:
block hash logic, configured to perform said plurality of hash computations on said each of said one or more message blocks according to the hash operation to produce said corresponding intermediate hash value.

14. The apparatus as recited in claim 1, wherein said opcode field directs said hash unit to load said one or more message blocks and to perform said plurality of hash computations.

15. An apparatus for performing hash operations, comprising:
an x86-compatible microprocessor, configured to execute an application program that is fetched from a memory, and configured to execute a single, atomic hash instruction within said application program that directs said x86-compatible microprocessor to perform one of the hash operations, wherein said single, atomic hash instruction is received by said x86-compatible microprocessor, and wherein said single, atomic hash instruction prescribes said one of the hash operations, said single, atomic hash instruction comprising:
an opcode field, configured to prescribe that the x86-compatible microprocessor accomplish said one or the hash operations; and
a repeat prefix field, coupled to said opcode field, configured to indicate that said one of the hash operations prescribed by the single, atomic hash instruction is to be accomplished on a message, said message comprising one or more message blocks;
said x86-compatible microprocessor comprising:
a hash unit, wherein said hash unit executes a first plurality of micro instructions generated by translation of said single, atomic hash instruction; and
an x86 integer unit, wherein said hash unit operates in parallel with said x86 integer unit to accomplish said one of the hash operations, and wherein said x86 integer unit executes a second plurality of micro instructions generated by translation of said single, atomic hash instruction to test a bit in a flags register, to update text pointer registers, and to process interrupts during execution of said one of the hash operations.

16. The apparatus as recited in claim 15, wherein said one of the hash operations is accomplished according to application-level privileges.

17. The apparatus as recited in claim 15, wherein said single, atomic hash instruction prescribes a hash algorithm to be employed in accomplishing said one of the hash operations.

18. The apparatus as recited in claim 17, wherein said hash algorithm comprises:
a SHA-1 algorithm, wherein said one of the hash operations comprises generation of a SHA-1 message digest for said message.

19. The apparatus as recited in claim 17, wherein said hash algorithm comprises:
a SHA-256 algorithm, wherein said one of the hash operations comprises generation of a SHA-256 message digest for said message.

20. The apparatus as recited in claim 17, wherein said hash algorithm comprises:
a SHA-384 algorithm, wherein said one of the hash operations comprises generation of a SHA-384 message digest for said message.

21. The apparatus as recited in claim 17, wherein said hash algorithm comprises:
a SHA-512 algorithm, wherein said one of the hash operations comprises generation of a SHA-512 message digest for said message.

22. The apparatus as recited in claim 15, wherein said single, atomic hash instruction is prescribed according to the x86 instruction format.

23. The apparatus as recited in claim 15, wherein said single, atomic hash instruction implicitly references a plurality of registers within said x86-compatible microprocessor.

24. The apparatus as recited in claim 23, wherein said plurality of registers comprises:
a first register, wherein contents of said first register comprise a pointer to a memory address, said memory address specifying a location in said memory for access of said message, upon which said one of the hash operations is to be accomplished.

25. The apparatus as recited in claim 23, wherein said plurality of registers comprises:
a first register, wherein contents of said first register comprise a pointer to a memory address, said memory address specifying a location in said memory for storage of a message digest that corresponds to said message.

26. The apparatus as recited in claim 23, wherein said plurality of registers comprises:

a first register, wherein contents of said first register indicate a number of bytes within said message.

27. The apparatus as recited in claim 15, wherein said x86-compatible microprocessor further comprises:
translation logic, configured to translate said single, atomic hash instruction into said first and second pluralities of micro instructions that specify sub-operations required to accomplish said one of the hash operations.

28. The apparatus as recited in claim 15, wherein said hash unit comprises:
block hash logic, configured to perform said plurality of hash computations on said each of said one or more message blocks according to said one of the hash operations to produce said corresponding intermediate hash value.

29. A method for performing hash operations in a x86-compatible microprocessor, the method comprising:
via fetch logic within the x86-compatible microprocessor, receiving a single, atomic hash instruction, wherein the single, atomic hash instruction is part of an application program stored in memory which is being executed by the x86-compatible microprocessor, and wherein the single, atomic hash instruction prescribes one of the hash operations;
translating the single, atomic hash instruction into a first plurality of micro instructions and a second plurality of micro instructions; and
via a hash unit disposed within execution logic in the x86-compatible microprocessor, executing the one of the hash operations, said executing comprising:
first executing the first plurality of micro instructions within the hash unit to produce output data;
second executing the second plurality of micro instructions within an x86 integer unit in parallel with said first executing to test a bit in a flags register, to update text pointer registers, and to process interrupts during execution of said hash operation; and
storing a corresponding intermediate hash value to memory prior to allowing a pending interrupt to proceed.

30. The method as recited in claim 29, wherein said receiving comprises:
specifying, within the single, atomic hash instruction, a hash algorithm to be employed in accomplishing the one of the hash operations.

31. The apparatus as recited in claim 30, wherein the hash algorithm comprises:
a SHA-1 algorithm, wherein the one of the hash operations comprises generation of a SHA-1 message digest for a message.

32. The apparatus as recited in claim 30, wherein the hash algorithm comprises:

a SHA-256 algorithm, wherein the one of the hash operations comprises generation of a SHA-256 message digest for a message.

33. The apparatus as recited in claim 30, wherein the hash algorithm comprises:
a SHA-384 algorithm, wherein the one of the hash operations comprises generation of a SHA-384 message digest for a message.

34. The apparatus as recited in claim 30, wherein the hash algorithm comprises:
a SHA-512 algorithm, wherein the one of the hash operations comprises generation of a SHA-512 message digest for a message.

35. The method as recited in claim 29, wherein said receiving comprises:
specifying, within the single, atomic hash instruction, that the one of the hash operations is to be accomplished on a message, wherein the message comprises one or more message blocks.

36. The method as recited in claim 29, wherein said receiving comprises:
prescribing the single, atomic hash instruction according to the x86 instruction format.

37. The method as recited in claim 29, wherein said receiving comprises:
implicitly referencing a plurality of registers within the x86-compatible microprocessor.

38. The method as recited in claim 37, wherein said implicitly referencing comprises:
first referencing a first register, wherein contents of the first register comprise a pointer to a memory address, the memory address specifying a location in the memory for access of a message upon which the one of the hash operations is to be accomplished.

39. The method as recited in claim 37, wherein said implicitly referencing comprises:
first referencing a first register, wherein contents of the first register comprise a pointer to a memory address, the memory address specifying a location in the memory for storage of a message digest, the corresponding message digest being generated as a result of said executing the one of the hash operations upon a message.

40. The method as recited in claim 37, wherein said implicitly referencing comprises:
first referencing a first register, wherein contents of the first register indicate the number of bytes within a message.

41. The method as recited in claim 29, wherein said executing is accomplished at the privilege level afforded to application programs.

* * * * *